(12) United States Patent
Rozen et al.

(10) Patent No.: US 10,872,004 B2
(45) Date of Patent: Dec. 22, 2020

(54) WORKLOAD SCHEDULING AND COHERENCY THROUGH DATA ASSIGNMENTS

(71) Applicant: Intel Corporation, Santa Clara, CA (US)

(72) Inventors: Piotr Rozen, Gdansk (PL); Sagar Koorapati, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 16/191,933

(22) Filed: Nov. 15, 2018

(65) Prior Publication Data

US 2019/0087225 A1  Mar. 21, 2019

(51) Int. Cl.
| | |
|---|---|
| *G06F 9/46* | (2006.01) |
| *G06F 9/54* | (2006.01) |
| *G06F 9/48* | (2006.01) |
| *G06F 9/50* | (2006.01) |

(52) U.S. Cl.
CPC ............ *G06F 9/546* (2013.01); *G06F 9/4843* (2013.01); *G06F 9/4881* (2013.01); *G06F 9/505* (2013.01); *G06F 9/5066* (2013.01); *G06F 2209/548* (2013.01)

(58) Field of Classification Search
CPC ........ G06F 9/461; G06F 9/5027; G06F 9/506; G06F 9/5044; G06F 9/5066; G06F 9/4843; G06F 9/546; G06F 9/505; G06F 9/4881; G06F 2009/548; H01L 29/0673
See application file for complete search history.

(56) References Cited

U.S. PATENT DOCUMENTS

| | | | |
|---|---|---|---|
| 2010/0025658 A1* | 2/2010 | Colli | H01L 29/0673 257/24 |
| 2012/0324447 A1* | 12/2012 | Huetter | G06F 9/5066 718/1 |
| 2013/0081044 A1* | 3/2013 | Sandstrom | G06F 9/5027 718/104 |
| 2015/0277973 A1* | 10/2015 | Xu | G06F 9/461 718/107 |
| 2018/0039523 A1* | 2/2018 | Akamine | G06F 9/5044 |

OTHER PUBLICATIONS

Charith Mendis et al., "Parallelizing WFST Speech Decoders", 2016 IEEE International Conference on Acoustics, Speech and Signal Processing, Mar. 2016, 5 pages.

* cited by examiner

*Primary Examiner* — Tuan A Vu
(74) *Attorney, Agent, or Firm* — Jordan IP Law, LLC

(57) ABSTRACT

Systems, apparatuses and methods may provide for technology that assigns a plurality of data portions associated with a workload to a plurality of cores, wherein each data portion from the plurality of data portions is only modifiable by a respective one of the plurality of cores. The technology may further pass a message between the plurality of cores to modify one or more of the data portions in response to an identification that the one or more of the data portions are unmodifiable by one or more of the plurality of cores.

17 Claims, 13 Drawing Sheets

370

372 — Assigning a plurality of data portions, that are associated with a workload, to a plurality of cores so that each data portion is only modifiable by a respective one of the plurality of cores 374 — Passing a message between the plurality of cores to modify one or more of the data portions in response to an identification that the one or more of the data portions are unmodifiable by one or more of the plurality of cores

FIG. 2

WORKLOAD SCHEDULING AND COHERENCY THROUGH DATA ASSIGNMENTS

TECHNICAL FIELD

Embodiments generally relate to enhanced workload distribution among cores of one or more processors. More particularly, embodiments relate to workload scheduling and coherency through data assignments.

BACKGROUND

A workload may be represented by a graph. For example, some sparse workloads may be a graph search used in applications such as speech recognition engines based on Viterbi searching. The sparse workloads may generate a large number of random accesses to memory. As an example, a cache hit rate may be relatively low due to relatively large knowledge databases, random memory access pattern and large number of issued transactions. The low cache hit rate causes inefficiency in the central processing unit (CPU) as the CPU waits for data instead of processing the workload. The inefficiency in CPU and memory bandwidth utilization directly leads to reduced battery life for client systems and/or total cost of ownership in datacenters, particularly when a workload is a dominating workload that utilizes many resources.

BRIEF DESCRIPTION OF THE DRAWINGS

The various advantages of the embodiments will become apparent to one skilled in the art by reading the following specification and appended claims, and by referencing the following drawings, in which:

FIG. 2 is a flowchart of an example of a method of efficient sparse workload scheduling and coherency for multi-core platforms according to some embodiments;

DESCRIPTION OF EMBODIMENTS

Figure 1A:
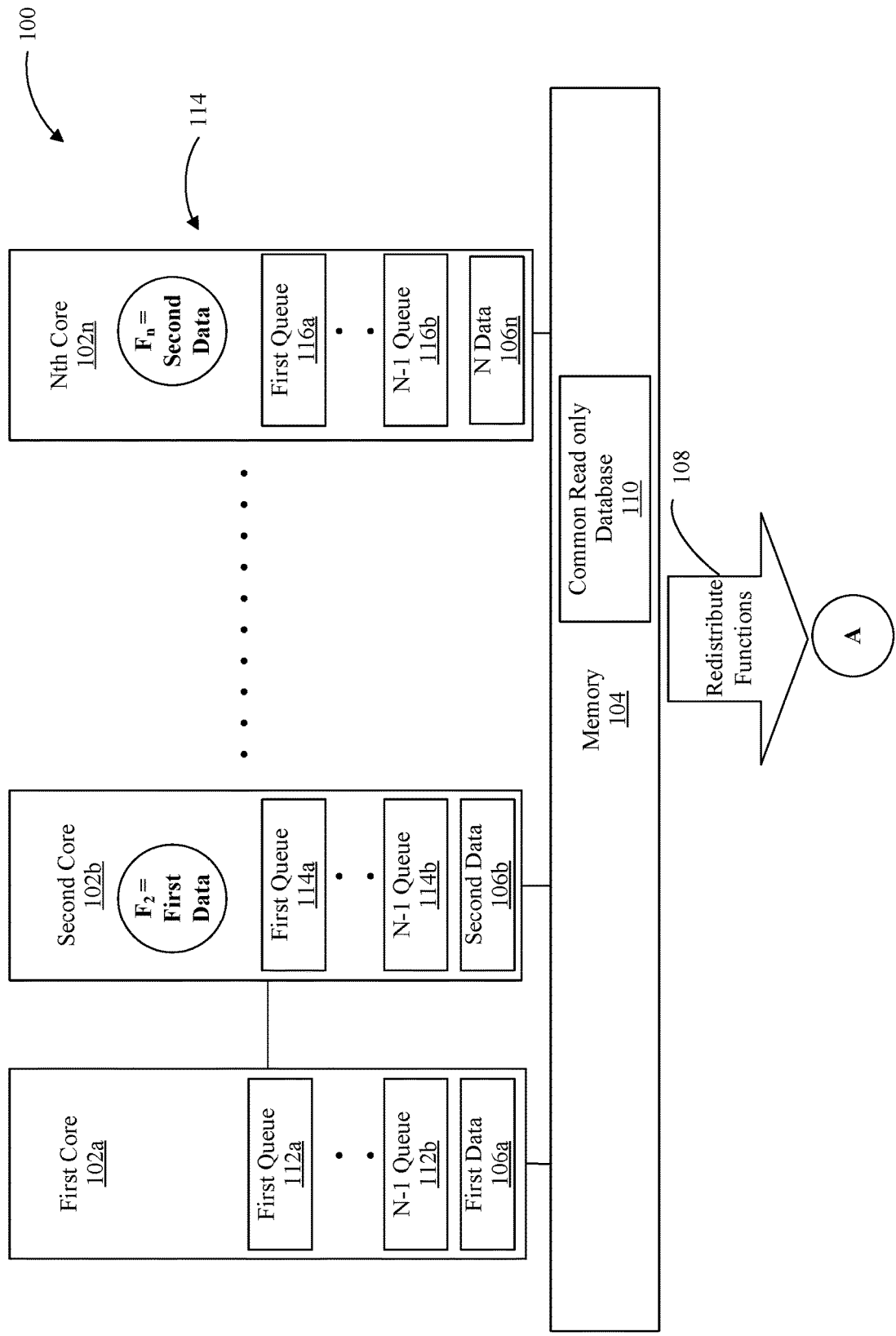
FIGS. 1A and 1B illustrate an example of an enhanced process to assign a workload and maintain coherency according to some embodiments.
Figure 1B:
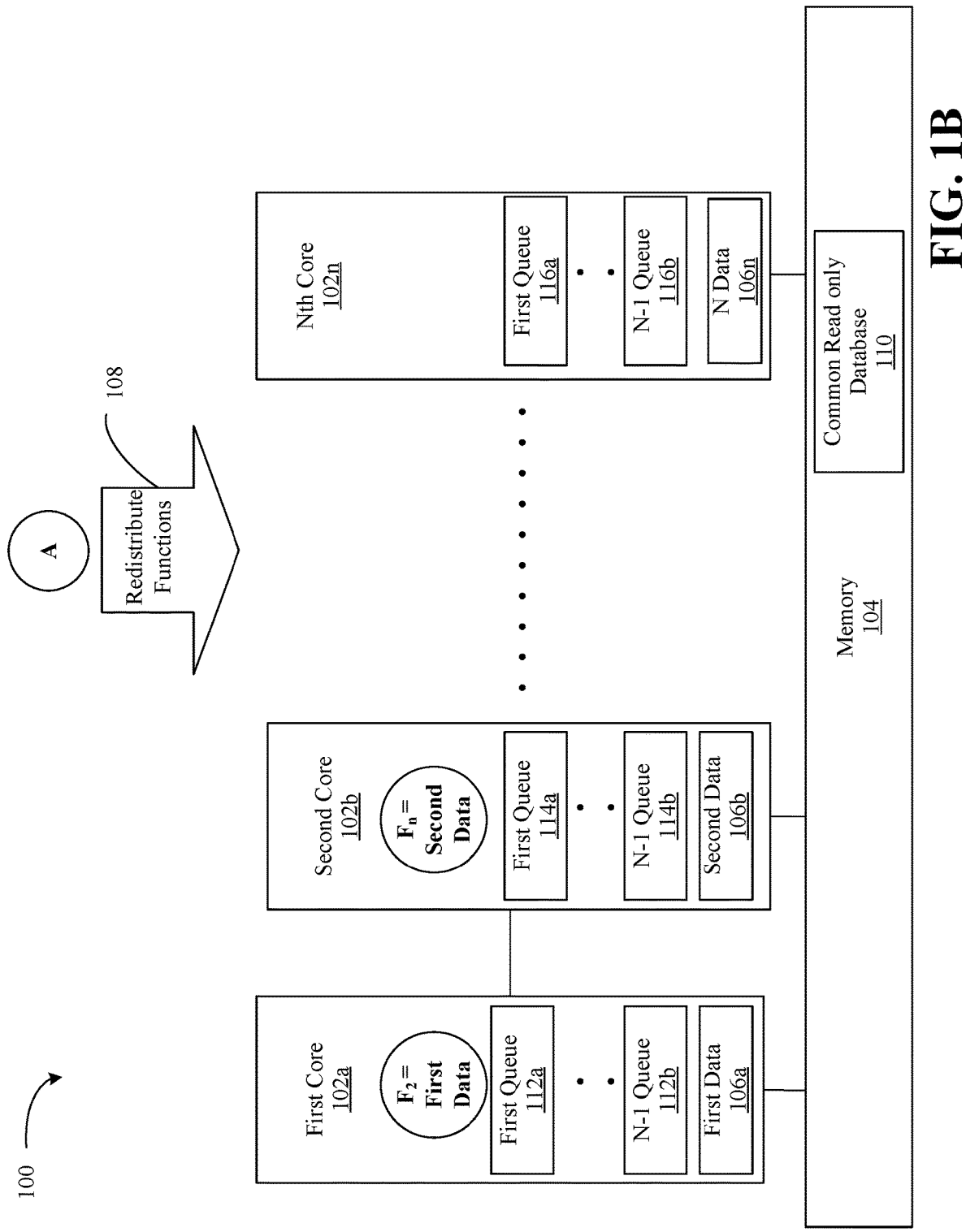

FIGS. 1A and 1B illustrate an enhanced process 100 in which the total number of first-Nth cores $102a$-$102n$ may be equal to the integer "N." Each of the first-Nth cores $102a$-$102n$ may include communication queues, which in this particular example corresponds to first to N−1 queues $112a$-$112b$, $114a$-$114b$, $116a$-$116b$. For example, the first core $102a$ includes first queue $112a$ to N−1 queue $112b$. The total number of queues of the first queue $112a$ to N−1 queue $112b$ may be equal to the value "N−1," or one less than a total number of the first-Nth cores $102a$-$102n$. Likewise, the second core $102b$ and Nth core $102n$ respectively include first queue $114a$ to N−1 queue $114b$, and first queue $116a$ to N−1 queue $116b$. Thus, a total of size of the first to N−1 queues $112a$-$112b$, $114a$-$114b$, $116a$-$116b$ is equal to the value of "(N−1)*N" to allow for coherent communications. As explained in detail below, each of the first to N−1 queues $112a$-$112b$, $114a$-$114b$, $116a$-$116b$ may facilitate communication between two cores from the cores $102a$-$102n$ while reducing synchronization costs, such as locking of data, to enhance efficiency and reduce latency.

The first-Nth cores $102a$-$102n$ may each be an "owner" of a particular data set of a workload (e.g., a sparse graph workload), which in this example corresponds to first-N data $106a$-$106n$. Each particular core of the first-Nth cores $102a$-$102n$ may be responsible for updating, modifying and controlling access to first-N data $106a$-$106n$ owned by the particular core. In some embodiments, the first-N data $106a$-$106n$ may be stored in shared memory 104 to be in non-overlapping regions without shared cache-lines.

The first-Nth cores $102a$-$102n$ may communicate with each other through first to N−1 queues $112a$-$112b$, $114a$-$114b$, $116a$-$116b$ to allow a respective one of the first-Nth cores $102a$-$102n$ to modify and/or update first-N data $106a$-$106n$. For example, messages may be passed through the first to N−1 queues $112a$-$112b$, $114a$-$114b$, $116a$-$116b$ to modify first-N data $106a$-$106n$. By doing so, an enhanced workload coherency and management scheme is achieved and maintained with reduced overhead and complexity than other schemes. Moreover, the first-Nth cores $102a$-$102n$ may have a simple hardware design that provides an efficient solution that may be as effective as custom hardware accelerators, but at far less cost.

In particular, each of the first to N−1 queues $112a$-$112b$, $114a$-$114b$, $116a$-$116b$ may only be accessible by two cores from the first-Nth cores $102a$-$102n$ to pass messages between the two cores. The two cores may include a receiving core for receiving a message and a passing core for passing the message to the receiving core. For example, the second core $102b$ may pass a message to a request section of the first queue $112a$ of the first core $102a$ to modify the first data $106a$. The message may include all read and/or write data required for an update to first data $106a$ owned by the first core $102a$. The first queue $112a$ may only be accessible by the first core $102a$ (i.e., the receiving core) and the second core $102b$ (i.e., the passing core). Thus, the Nth core $102n$ may not access the first queue $112a$. Rather, the Nth core $102n$ may access a different queue, such as N−1 queue $112b$ of the first core $102a$, to pass a message to the first core $102a$. Further, if the first core $102a$ is to pass a message to the second core $102b$ to modify the second data $106b$, then the first core $102a$ would write into one of the first to N−1 queues $114a$-$114b$ of the second core $102b$, such as the first queue $114a$. Thus, the first-Nth cores $102a$-$102n$ may pass messages through dedicated queues $112a$-$112b$, $114a$-$114b$, $116a$-$116b$ that are each only accessibly by two cores. By doing so, coherency may be maintained without locking of data or first to N−1 queues 112a-112b, 114a-114b, 116a-116b. Moreover, shared read only (RO) data may be omitted from messages as any read from the common read only database 110 will always be coherent.

The first-Nth cores 102a-102n may be part of a System-on-Chip (SOC) 114. The first-Nth cores 102a-102n may not necessarily utilize a hardware coherency scheme in order to create a sparse workload accelerator, thus achieving a lower cost due to a distributed management system spread out across the first-Nth cores 102a-102n. In detail each of the first-Nth cores 102a-102n may operate as a service provider that owns a fragment of shared data in memory 104. Only a particular core from the first-Nth cores 102a-102n has permission to modify the given data fragment. If another core from the first-Nth cores 102a-102n is operating on a part of the workload to modify data that the another core does not own (the data is unmodifiable by the another core), the another core may send a message to the data owner from the first-Nth cores 102a-102n to request the modification. The message may include all the required data (e.g., parameters, values, newest read/write data generated by the another core) for the requested modification, and may be communicated through the first-N−1 queues 112a-112b, 114a-114b, 116a-116b. It may be unnecessary for the message to include shared read only data as described above, and thus data stored in the common read only database 110 may be excluded from the message. Thus, no other coherency mechanism may be required as only one core from the first-Nth cores 102a-102n has privilege to modify data that the one core "owns."

Thus, efficient accessing of far memory is addressed in a brute force manner. In detail, one of the first-Nth cores 102a-102n (e.g., simple RISC or similar cores) are used to create a transaction to a random far memory location and process first-N data 106a-106n. The series of small first-Nth cores 102a-102n may provide a benefit of having relatively low leakage, and as a consequence, low energetic cost of waiting for data. In contrast, in some multithreaded custom systems that can change threads during a stall, there is a cost of thrashing of L1 data cache pages, which degrades performance. In the above approach, the L1 cache (e.g., an onboard cache) for each of the first-Nth cores 102a-102n holds only data that the first-N core 102a-102n controls, thereby reducing cache evictions for first-N data 106a-106n, so that L1 cache thrashing may be mitigated.

As an example, the first core 102a may control the first data 106a, the second core 102b may control the second data 106b and the Nth core 102n may control the N data 106n. An "a priori" function or scheduler (may be a part of the SOC) may assign the first-N data 106a-106n to the first-N core 102a-102n. In some embodiments, the a priori function or scheduler may be implemented by all of the first-Nth cores 102a-102n.

In the illustrated example, the first-N data 106a-106n are stored directly in local cache of the first-Nth cores 102a-102n. In some embodiments however the first-N data 106a-106n may be stored into the memory 104. For example, the first-N data 106a-106n may be stored in non-overlapping segments (separated cache lines) of the memory 104 that each follow a separate eviction process. For example, the first data 106a may be stored in the memory 104 in a first memory segment that follows a first eviction process (e.g., a first time-to live and first policies) that only applies to the first data 106a, while the second data 106b may be stored in a second memory segment that follows a second eviction process (e.g., a second time-to-live and second policies different from the first time-to-live and first policies) that applies only to the second data 106b. As such, a portion of the second data 106b may be evicted based on the second eviction process, while the first data 106a would not be evicted according to the second eviction process. In some embodiments, each of the first-Nth cores 102a-102n may only be able to access a particular memory segment of the memory 104 that stores the corresponding first-N data 106a-106n to maintain coherency.

The second core 102b may be executing a Function $F_2$ (i.e., a portion of a workload) which among other features, may modify the first data 106a. In order to process the function $F_2$, the second core 102b may access the common read only database 110 of memory 104 to retrieve instructions, parameters and so on. The second core 102b does not control the first data 106a, and therefore the second core 102b may determine that the second core 102b is unable to modify the first data 106a. Thus, the second core 102b may not be able to complete function $F_2$ since the function $F_2$ must update first data 106a.

Further, the Nth core 102n may be executing a Function $F_n$ (i.e., another portion of a workload) which among other features, may modify the second data 106b. To process the function $F_n$, the Nth core 102n may access the common read only database 110 to retrieve instructions, parameters and so on. The Nth core 102n does not control the second data 106b, and therefore the Nth core 102n may determine that the Nth core 102n is unable to modify the N data 106n. Thus, the Nth core 102n may not be able to complete function $F_n$ since the function $F_n$ must modify the second data 106b.

Process 108 may redistribute the functions $F_2$, $F_n$ so that the functions $F_2$, $F_n$ may complete and modify the first data 106a and N data 106n. As illustrated in FIG. 1B, the function $F_2$ may be redistributed to the first core 102a via first queue 112a to complete execution so that the first core 102a executes an operation (which may be a part of the function $F_2$ or the entire function $F_2$) of the workload to modify the first data 106b. For example, the second core 102b may send a message through the first queue 112a to the first core 102a, that includes an instruction and/or parameters to the first core 102a to execute the function $F_2$ to modify the first data 106a. The message may include all the required data (e.g., parameters and/or final data values) for the requested modification to the first data 106a, and then first core 102a may execute the function $F_2$ to modify the first data 106a based on the required data. In some embodiments, the message may include an instruction, without the required data, to execute the function $F_2$, and the first core 102a may then retrieve relevant parameters from the common read only database 110. In some embodiments, the second core 102b may execute the function $F_2$, determine a final value for the function $F_2$ and pass the final value to the first core 102a. The first core 102a may then only need to execute an operation (which may be a part of a function or the entire function) of the workload to update the first data 106a based on the final value and may not need to execute the function $F_2$.

Similarly, the function $F_n$ may be redistributed to the second core 102b via the N−1 queue 114b so that the function $F_n$ may modify the second data 106b, similarly to as above. For example, the Nth core 102n may send a message to the second core 102b via the N−1 queue 114b. The message may include required data and/or parameters to execute function $F_n$ in some embodiments. In some embodiments, the Nth core 102n may execute the function $F_n$ and pass a final value to the second core 102b which is then used to update the second data 106b. The second core 102b may then only need to execute an operation of the workload to update the second data 106b based on the final value from the Nth core 102n and may not need to execute the function $F_n$.

Thus, the second core 102b may instruct the first core 102a via first queue 112a to execute at least part of an operation to modify the first data 106a in response to a determination that the second core 102b is unable to modify the first data 106a. Further, the Nth core 102n may instruct the second core 102b to execute at least part of an operation to modify the second data 106b via N−1 queue 112b in response to a determination that the Nth core 102n is unable to modify the second data 106b.

In some embodiments, each of the first-Nth cores 102a-102n may be able to communicate with only a predetermined number of the first-Nth cores 102a-102n, and relay messages on behalf of others of the first-Nth cores 102a-102n. By doing so, the number and/or size of the first to N−1 queues 112a-112b, 114a-114b, 116a-116b may be reduced and/or dedicated more completely to processing workloads. For example, each of the first to N−1 queues 112a-112b, 114a-114b, 116a-116b may include a first partition to receive messages from other cores of the first-Nth cores 102a-102n, and a second partition to store data related to currently executing functions of the workload. As the size and number of the first partitions increases, the size and number of the second partition may decrease thereby increasing the latency of workload execution since more data will need to be retrieved from locations such as memory 104 and/or L2, L3, L4 caches (not illustrated). As such, reducing the size of the first partition may be desirable. In some embodiments, the data related to the currently executing functions of the workload may be stored outside of the first to N−1 queues 112a-112b, 114a-114b, 116a-116b in memory (e.g., no second partitions). It is noted however that as the size and number of the first to N−1 queues 112a-112b, 114a-114b, 116a-116b increases, the available size of memory allocated to processing workloads diminishes to thereby decrease cache hits and increase latency.

Thus, it may be desirable to reduce the number of the first to N−1 queues 112a-112b, 114a-114b, 116a-116b to reduce the number (size) of the first partitions. Therefore, each of the first-Nth cores 102a-102n may only communicate with less than a total number of others (e.g., one, two, or three, etc.) of the first-Nth cores 102a-102n. For example, the first core 102a may only include one queue, such as first queue 112a, to communicate with the second core 102b while omitting the remainder of the queues, such as the N−1 queue 112b. In some embodiments, each of the first-Nth cores 102a-102n may communicate based on proximity, and with closest cores of the first-Nth cores 102a-102n. So for example, the first core 102a may communicate with the second core 102b, that is physically closest to the first core 102a, but unable to directly communicate with the Nth core 102n. As such, the first partition of the first queue 114a of the second core 102b may have a dedicated allocation for messages from the first core 102a, and the first partition of the first queue 112a of the first core 102a may have a dedicated allocation for messages from the second core 102b.

A "message hopping implementation" may facilitate communication between all of the cores 102a-102n. That is, the first core 102a may need to relay a message through the second core 102b to communicate with the Nth core 102n. For example, assume that the Nth core 102n cannot directly receive a message from the first core 102a as the first partition of the first queue 116a does not have a dedicated allocation for the first core 102a message, but the Nth core 102n may directly receive a message from the second core 102b as the first partition of the first queue 116a does have an allocation for a message of the second core 102b. If the first core 102a is to pass a message to the Nth core 102n to modify N data 106n, the first core 102a may relay the message through the second core 102b, which in turn may relay the message to the Nth core 102n. Thus, each core of the first-Nth cores 102a-102n may be able to communicate with the other first-Nth cores 102a-102n through a message relay.

Thus, the above approach only allows for one of the first to N cores 102a-102n to modify corresponding first-N data 106a-106n to enhance cache reuse rates. For example, each of the of the first to N cores 102a-102n may maintain the corresponding data 106a-106n in local caches and/or memory 104 to enhance accessibility and reuse rates of relevant data. Thus, there is higher L1 data cache hit rate compared to other implementations as every core 102a-102n handles a fragment of a graph of a workload instead of the whole graph.

The above approach, even without hardware threads, specialized hardware, and/or custom controllers, may compete with specialized hardware for a wide range of dual-data rate memory latency settings. Moreover, the above approach may enhance bandwidth utilization for workloads, particularly sparse workloads. Further, as noted, the novel workload scheduling is based on an owner of the data, and enforces data coherency in an efficient manner without a dedicated hardware component. In detail, each of the first-Nth cores 102a-102n may be a service provider that owns a fragment of shared data as the first-N data 106a-106n. Due to the data ownership scheme and passing messages through the first to N−1 queues 112a-112b, 114a-114b, 116a-116b to modify data, no other coherency mechanism may be needed.

Some examples of workloads that may be efficiently accelerated according to the above are speech recognition (e.g., based on Viterbi search), machine translation, a subset of graph algorithms etc. A cost of message creation, transport and processing may be lower compared to other approaches where a core or thread needs to invalidate cache, lock access to shared data, load data to cache, process data, write back data to shared memory, unlock access, processing pipeline reset and coherency management, etc. Moreover, a die area required to build a simple processing unit that uses the above approach is smaller compared to a specialized unit that implements hardware threads and shared data locking and hardware coherency mechanisms. A performance of single threaded implementation is competitive with multi-threaded implementations in which a thread switch cost is significant compared to far memory access latency. It should be noted however that the above implementation may be applied to a multi-threaded implementation as well as single-thread implementations.

The number of first-Nth cores 102a-102n (which may include FPGAs) may be any number of cores. In some embodiments however the first-Nth cores 102a-102n may be distributed across different SoCs in a same computing device or different computing devices (e.g., nodes in a function-as-a service environment). For example, some of the first-Nth cores 102a-102n may be in a first compute node (e.g., a first server) while others of the first-Nth cores 102a-102n may be in a second compute node (e.g., a second server) of a networked and/or FaaS architecture.

FIG. 2 shows a method 370 that may provide efficient sparse workload scheduling and coherency for multi-core platforms. The method 370 may generally be implemented by an enhanced SoC system, such as, for example the SoC 114 (FIG. 1), already discussed. In an embodiment, the method 370 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 370 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 372 assigns a plurality of data portions associated with a workload to a plurality of cores, wherein each data portion is only modifiable by a respective one of the plurality of cores. As such, each core may be considered an "owner" of a particular data fragment of the workload. Illustrated processing block 374 passes a message between the plurality of cores to modify one or more of the data portions in response to an identification that the one or more of the data portions are unmodifiable by one or more of the plurality of cores. For example, if a core is executing an operation and/or function that modifies a data portion owned by another core, the core may pass a message to another core to modify the data portion. Further, illustrated processing block 374 includes assigning a first queue to the core, where the first queue includes at least a portion that only the core and another core are to access, and reading, by the other core, the at least the portion of the first queue to read an instruction from the core to execute the at least the part of the operation. Thus, the method 370 may enhance execution, minimize cost and reduce latency of a workload. For example, the method 370 may enhance cache hit rates to reduce the latency, without requiring specialized hardware.

Figure 3:
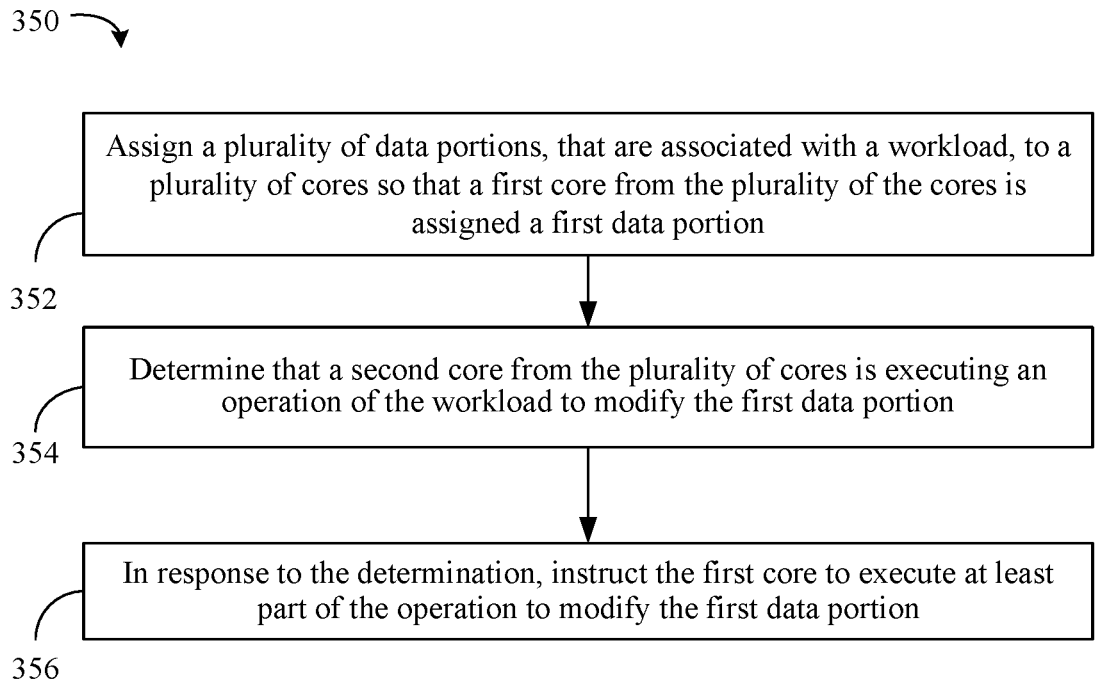
FIG. 3 is a flowchart of an example of a method of managing coherency and workload distribution among first and second cores of a multi-core platform according to some embodiments.

FIG. 3 shows a method 350 of managing coherency and workload distribution in a multi-core platform including first and second cores. The method 350 may generally be implemented in an enhanced SoC system, such as, for example enhanced processing system 100 (FIG. 1), already discussed. More particularly, the method 350 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 352 assigns a plurality of data portions associated with a workload to a plurality of cores so that a first core from the plurality of the cores is assigned a first data portion. Illustrated processing block 354 determines that a second core from the plurality of cores is executing an operation of the workload to modify the first data portion, for example by accessing a common database to retrieve parameters and instructions. Illustrated processing block 356 instructs, in response to the determination by block 354, the first core to execute at least part of the operation to modify the first data portion. For example, to execute the operation, the first and/or second cores may access the common database.

Moreover, block 356 may include utilizing a queue, that is assigned to the first core, to pass a message from the second core to the first core to instruct the first core to execute at least part of the operation. In an embodiment, the queue includes a read pointer that is written by the first core, and read by the second core to check if there is a free slot in the queue for placing a message. The queue further has a write pointer that is written by the second core and read by the first core to check if there is new message to be read. There may be "N messages slots" that are written by the second core and read by the first core.

For the case where the second core wants to send a message to the first core, the sequence may include the following. The second core may check if there is a free slot in the queue by loading the read pointer and the write pointer. If there is no slot, the second core may process the queues of the second core to free slots for other cores such as the first core. Thereafter, the second core may identify a slot from the N message slots in the queue to write the message within, and then write the message to the identified slot. The second core may update the write pointer. After some period of time, the first core may load the read and write pointers. If the write pointer indicates that there is a message, the first core reads the message. The first core updates the read pointer and may additionally add a free slot for writing if needed.

The second core may further pass parameters to the first core through the queue (e.g., in the message) to process the operation. In some embodiments, the read pointer to the queue and the write pointer to the queue do not share the same region. In some embodiments, if the system is using cached access to a region with read and write pointers of the queue, then the read and write pointers do not share the same cache line to enforce the coherency and separation between read and write portions of the queue.

Figure 4:
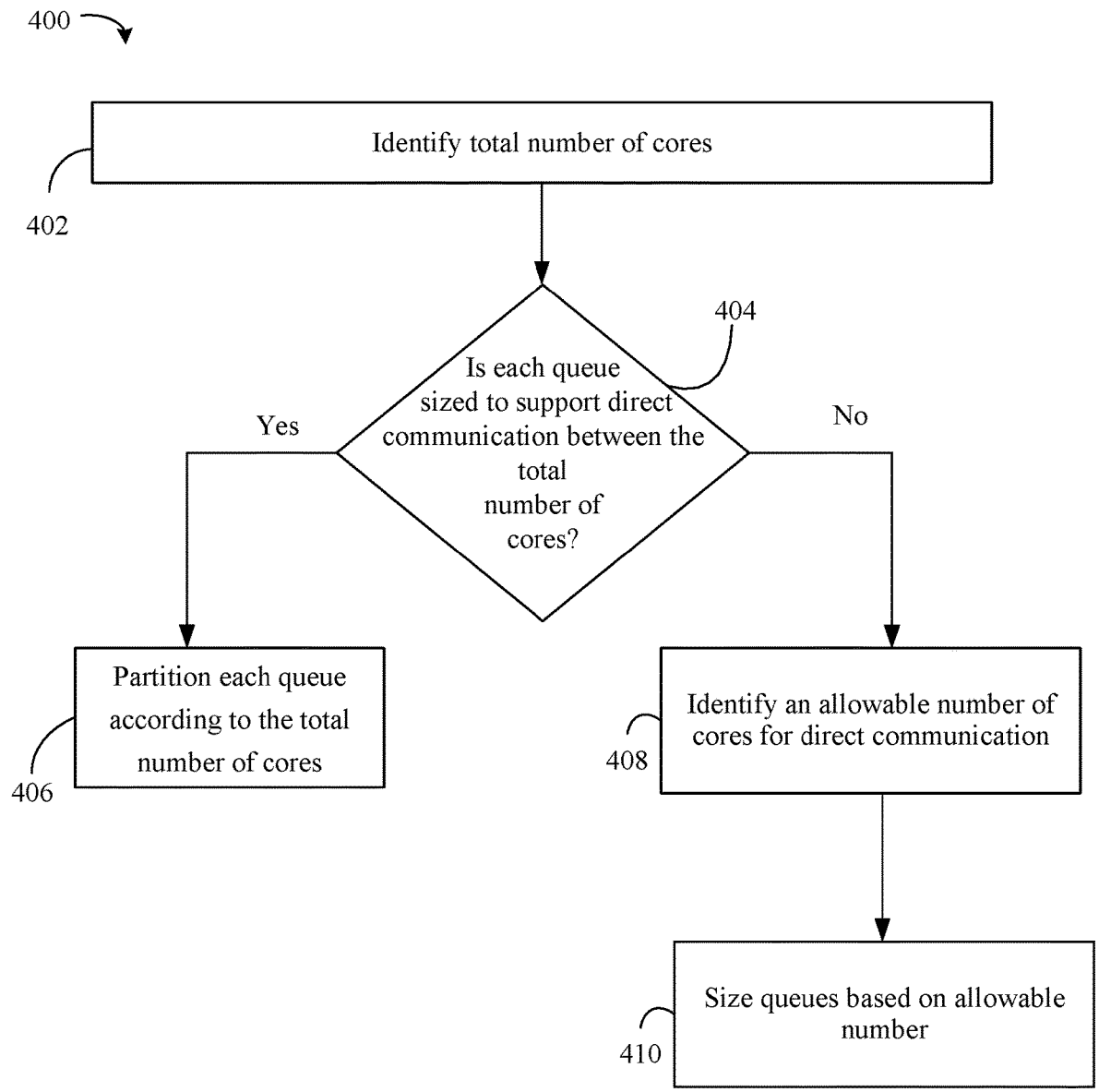
FIG. 4 is a flowchart of an example of a method of queue assignment in a multi-core platform according to an embodiment.

FIG. 4 shows a method 400 of queue assignment in a multi-core platform. The method 400 may generally be implemented in an enhanced SoC system, such as, for example the SoC 114 (FIG. 1), already discussed. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 identifies a total number of cores in the multi-core platform. Illustrated processing block 404 determines if each queue is sized to support direct communication between the total number of cores. As already described, each of the cores may be assigned one or more queues. Each core may utilize the one or more queues to receive messages from other cores, and in some embodiments to process a workload assigned to the core. For example, each queue may include a first partition to receive messages, and a second partition to process the workload.

The first partitions may need to be maintained under a certain size to ensure that the second partitions are able to support the workload. In some embodiments, the second partitions may be omitted and the workload may be stored in associated memory of the cores. In such embodiments, the queues may still be maintained under the certain size to ensure that sufficient memory is allocated to the workload. Thus, if to support direct communication between the total number of cores, the summation of the sizes (e.g., total memory used by the first partitions and/or queues) and/or number of the first partitions and/or queues would increase to above the certain size, processing block 404 may determine that direct communication between the total number of cores cannot be supported. If processing block 404 determines that the queues may be sized to support the total number of cores, each queue may be partitioned to allow direct communication between all of the cores.

If processing block 404 determines that the queues cannot be sized to support the total number of cores, illustrated processing block 408 may identify an allowable number of cores for direct communication to allow the first partitions and/or queues to be maintained at or below the certain size. Illustrated processing block 410 may size the queues accordingly so that the each core includes a maximum number of queues to support the allowable number of cores for direct communication, with each queue allowing communication between the core and only one other core. While not illustrated, each respective core of the plurality of cores may directly communicate with a subset of the cores that are closest to the respective core where the number of cores in the subset is equal to the allowable number.

Thus, direct communication may include passing a message from a first core to a second core without relaying the message through any other core. Indirect communication may be supported by, for example, relaying messages throughout the cores as described above. Thus, indirect communication may include passing a message from a first core to a second core through one or more other cores that relay the message to the second core. As such, message hopping may occur to maintain coherency while reducing an overall memory allocation of the queues. Therefore, the queues may maintain coherency, and hops via intermediate core(s) may be utilized to enhance (reduce) a number of queues that each core maintains.

Figure 5:
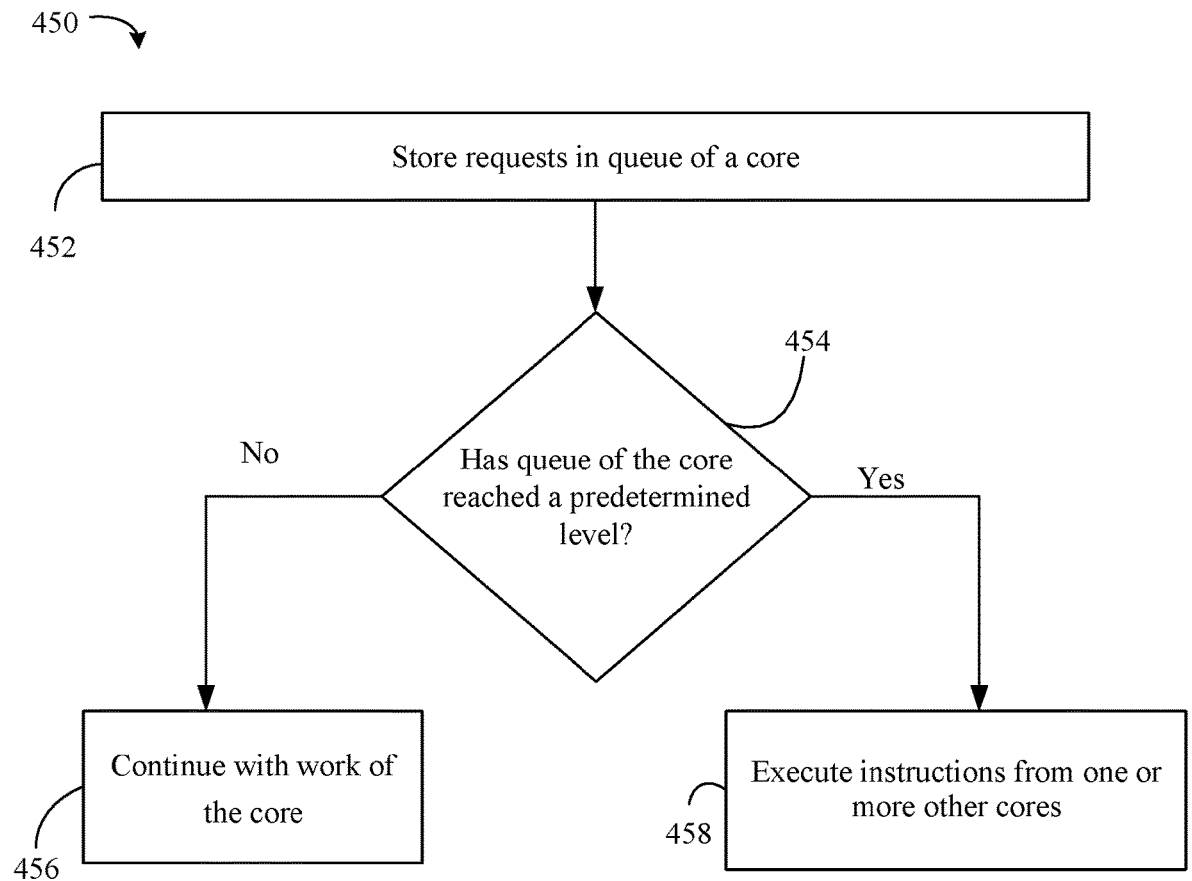
FIG. 5 is a flowchart of an example of a method of queue processing according to an embodiment.

FIG. 5 shows a method 450 of queue processing by a core in a multi-core platform. The method 450 may generally be implemented in an enhanced SoC system, such as, for example SoC 114 (FIG. 1), already discussed. More particularly, the method 450 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 452 stores requests in a queue of a core. The requests may be in the form of messages that include instruction to the core to modify data. The core may own the data such that only the core may modify and/or access the data. The messages may originate with one or more other cores in the multi-core system that cannot access and/or modify the data. In illustrated processing block 454, the core periodically scans the queue (e.g., by checking a write pointer) to determine whether new messages have arrived. In detail, the message may be considered old when the message was stored in the queue during a directly preceding last scan and/or the core has completed the instructions of the message. In an embodiment, a message is considered new when the message was not previously in the queue during the directly preceding last scan and/or the core has not completed the instructions of the message. When the number of new messages has reached a predetermined level, illustrated processing block 458 may begin execution of the instructions from another core. If not, illustrated processing block 456 may continue with work of the core that is not assigned from other cores. The core may continue to receive requests simultaneously with one or more of the blocks 454, 456, 458.

Figure 6:
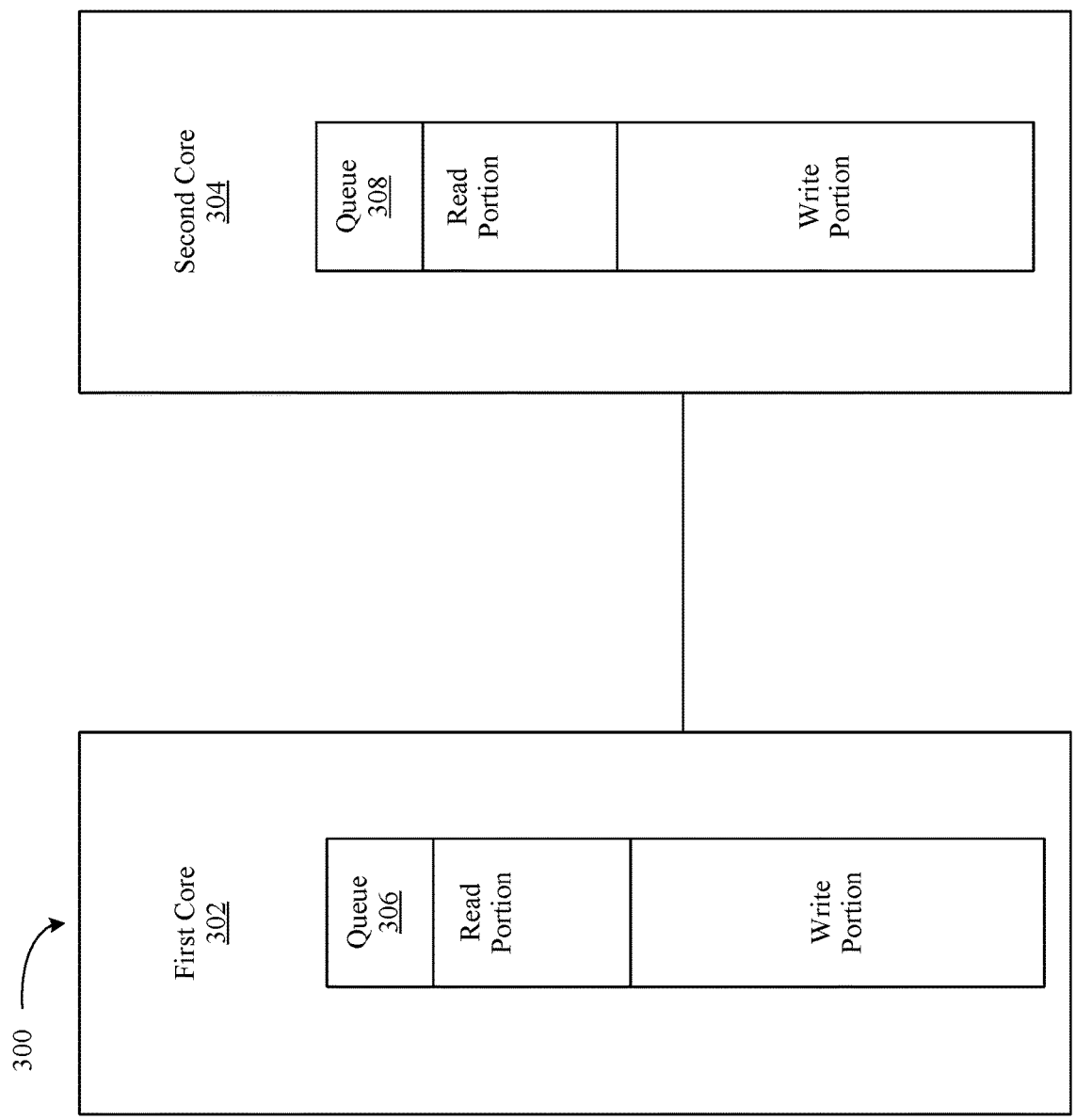
FIG. 6 is an example of an enhanced processing system that includes first and second cores according to some embodiments.

FIG. 6 illustrates an enhanced processing system that includes first core 302 and second core 304. As illustrated, each of the first and second queues 306, 308 include a read portion and a write portion. To ensure that there is no single location that more than one core writes into, the read position and the write position are separated in each queue 306, 308. For example, the read position to the read portion of the queue 306 may be separate from the write position to the write portion of the first queue 306.

For example, message data may be placed in a common read/write (RD/RW) section (for example the write portion). The receiver core reads and sender core writes to the common RD/RW section. For example, cached access to the message data section of queues 306, 308 as data may be read and written in bursts for software implementations. A size of a message if cached access is utilized may be a multiplication (e.g., one times, two times, etc.) of the cache line size. As described, read and write pointers are placed in separate regions such as the read portion and the write portion. Additionally, the read and write pointer may not share the same cache line if they are placed in cached region (preferred uncached access).

For example, when the first core 302 is to deliver a message to the second core 304 to modify data owned by the second core 304, the first core 302 may write into the write portion of the queue 308. The second core 304 may scan the write portion to identify and process the message from the first core 302. Similarly, the second core 304 may send a message to the first core 302 through the write portion of the queue 306 to instruct the first core 302 to modify data that is owned by the first core 302.

Each message may be padded to an "L1 cache line size" that stores the queues 306, 308 to utilize burst reads and while maintaining data coherency. While the queues 306, 308 are illustrated as being part of the first core 302, and the second core 304, it will be understood that the queues 306, 308 may be stored in a memory connected to the first and second cores 302, 304.

As an example, the first and second cores 302, 304 may be part of a multi-core system, such as an SoC. The multi-core system may include a total of "N cores." Every respective core of the multi-core system, including cores 302, 304, may have N−1 queues, that similar to the queues 306, 308. In some embodiments however, not all cores may communicate with each other and so there may be less than "N−1" queues to reduce the sizes of the read portions and increase the sizes of the write portions.

Figure 7:
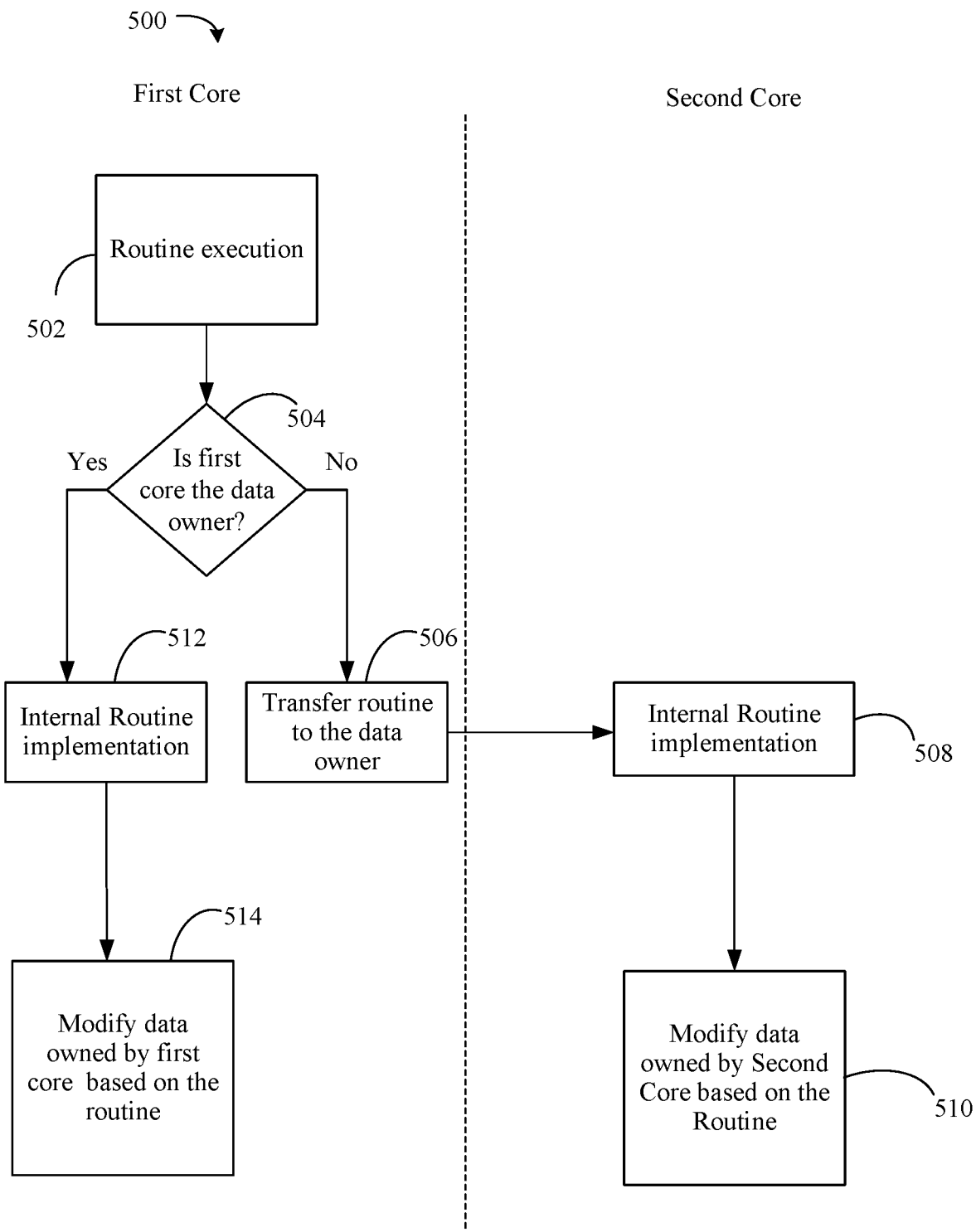
FIG. 7 is a flowchart of an example of a method of processing a routine in a multi-core system according to some embodiments.

FIG. 7 shows a method 500 of processing a routine in a multi-core system. The method 500 may generally be implemented in an enhanced SoC system, such as, for example the SoC 114 (FIG. 1), already discussed. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

As illustrated, illustrated processing blocks of method 500 are divided between a first core and a second core. Illustrated processing block 502 executes a routine. In an embodiment, the routine includes one or more functions, operations, modifications to data, etc. Illustrated processing block 504 determines whether the first core is the owner of data that is to be modified by the routine. If so, illustrated processing block 512 executes an internal routine implementation at the first core. Illustrated processing block 514 modifies the data owned by the first core based on and during execution of the routine.

If it is determined in illustrated processing block 504 that the first core is not the owner of the data, illustrated processing block 506 transfers the routine to the owner of the data, which is the second core in this example. For example, illustrated processing block 506 may pass a message from the first core to the second core to transfer the routine. Illustrated processing block 508 executes the routine internally on the second core, and may include unpacking parameters from the message. Illustrated processing block 510 modifies the data owned by the second core based on and during execution of the routine.

Figure 8:
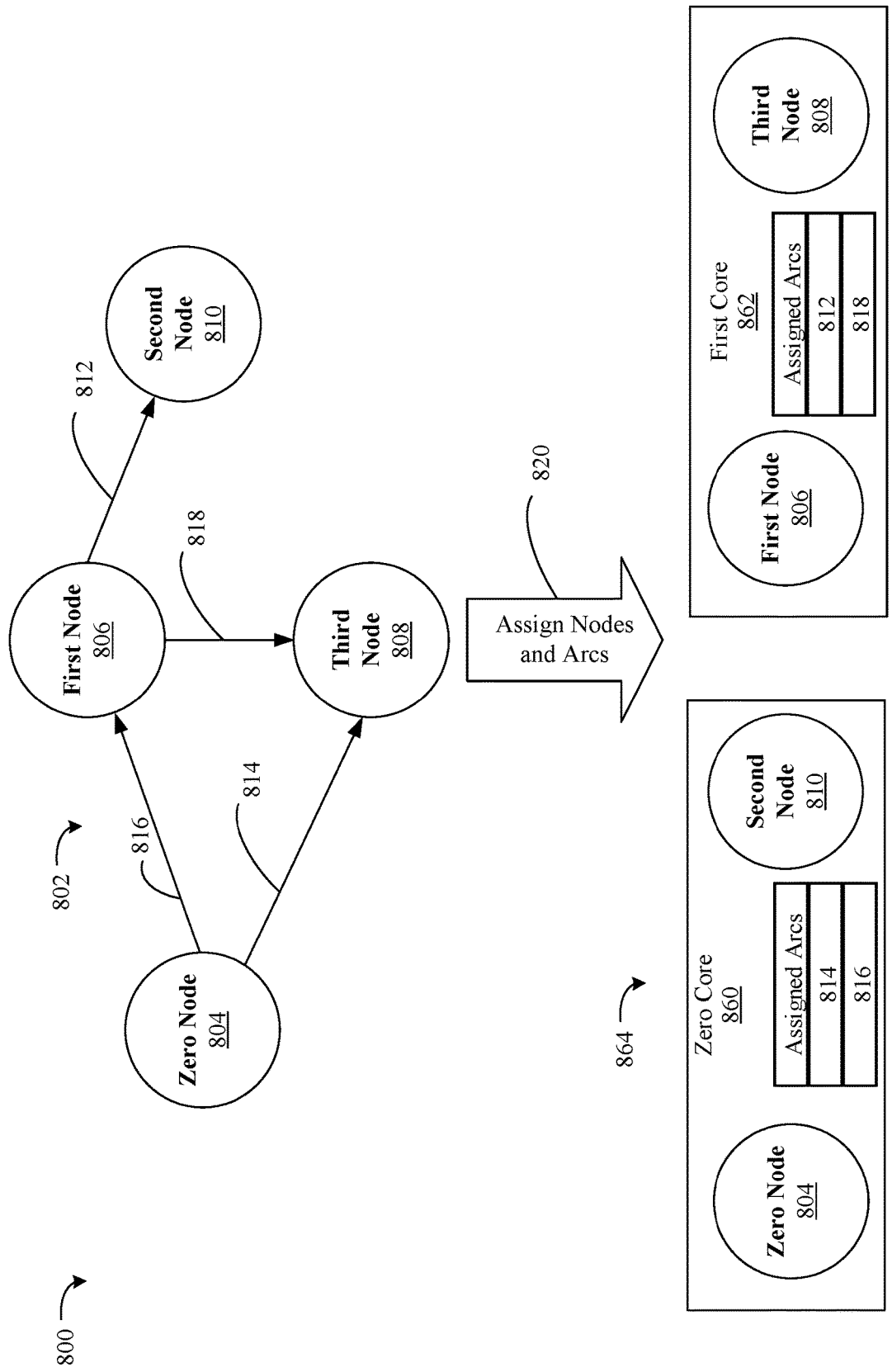
FIG. 8 illustrates a process of scheduling a sparse graph workload according to some embodiments.

FIG. 8 illustrates a process 800 of scheduling a sparse graph workload 802. In the present example, an SoC 864 includes two cores 860, 862. The two cores 860, 862 are respectively assigned numbers "zero" and "one." The scheduling policy may balance the workload and enforce coherency across the zero and first cores 860, 862.

As illustrated, the sparse graph workload 802 includes zero node 804, first node 806, second node 810 and third node 808. Arcs 812, 814, 816, 818 connect the zero node 804, the first node 806, the second node 810 and the third node 808. To assign the sparse graph workload 802 to the zero and first cores 860, 862, process 820 may utilize an a priori function that operates based on modulo core counts. For example, Equation 1 may assign the zero-third nodes:

Core ID=graph node ID modulo core count      Equation 1

The core ID may correspond to the number (either zero or one) of the zero and first cores 860, 862, and is calculated for each of the zero-fourth node 804, 806, 810, 808. The graph node ID may correspond to the number of a respective node from the zero-fourth node 804, 806, 810, 808. So, in the above example, there are two cores 860, 862, hence making the core count always two.

To assign the zero node 804 to a core from the zero core 860 and the first core 862, Equation 1 may be calculated. That is, zero node 804 has a graph node ID of "0." Thus, the Core ID=0 modulo 2 which is zero. Therefore, the zero node 804 is assigned to zero core 860. The arcs 816, 814 may also be assigned to the zero core 860 since those arcs originate from the zero node 804.

Similarly, the first node 806 may have graph node ID of "1." Using Equation 1, the Core ID of the first node 806 may be 1 mod 2, which is one. Thus, the first node 806 is assigned to first core 862, and arcs 812, 818 are also assigned to the first core 862 since the arcs 812, 818 originate at the first node 806.

Similarly, the second node 810 may have graph node ID of "2." Using Equation 1, the Core ID of the second node 810 may be 2 mod 2, which is zero. Thus, the second node 810 is assigned to zero core 860. Likewise, the third node 808 may have graph node ID of "3." Utilizing Equation 1, the Core ID of the third node 808 may be 2 mod 3, which is one. Thus, the third node 808 is assigned to first core 862.

Each of the zero and first core 860, 862 processes only a workload associated with the fragment of the graph workload 802 that has been assigned to that zero and first core 860, 862.

In the above example, graph 802 may represent a fragment of Dijkstra's algorithm is to find the shortest paths between zero-fourth nodes 804, 806, 810, 808, where the arcs 812, 814, 816, 818 may represent lengths (e.g., road networks). Each of the zero and first cores 860, 862 may expose remotely callable (via messages) routines that processes workload. Pseudo code is provided below for each of the zero and first cores 860, 862:

```
Update Path Cost (Node_ID, new cost) {
    Target core = Node ID % Get_Core_Count( );
    If (Get_Core_ID( ) == Target core)
    {
        if (new cost < cost[Node ID])
        {
            // the cost database is in processor owned area
            cost[Node ID] = new cost;
            ProcessNode(Node ID);
        }
    }
    Else
    {
        Message msg = null;
        Q = GetQueue(Get_Core_ID( ), Target Core);
        while (null == msg)
        {
            ProcessMessage( );
            msg = GetMessagePointer(Q.WR position);
        }
        msg.Code = Update_Path_Cost_ID;
        msg.Node_ID = Node_ID;
        msg.cost = new_cost;
        PostMessage(Q, msg);
    }
}
ProcessNode(Node ID)
{
    For each arc of the node (Node ID)
    {
        Update Path Cost(arc.Node_ID, cost[Node_ID] +
        arc.cost);
    }
}
On Update Path Cost Message(Message msg)
{
    Update Path Cost (msg.Node_ID, msg.cost)
}
```

The scheduler and queue handling routines may be provided in the following pseudocode, which may be implemented by the zero core 860 and first core 862:

```
Input: mapping between the message code and routine function
    typedef void (*msg_handler_t)(Message msg)
    const msg_handler_t* handlers;
Main scheduling routines:
    ProcessMessage( )
    {
        For each Q in input queue
        {
            while (Q.RD position < Q.WR position)
            {
                Message msg = Q.GetMessagePointer(Q.RD
                position);
                Invalidate_L1_cache(msg);
                Handlers[msg.Code](msg);
                Increment(Q.RD position);
                Writeback.GetMessagePointer (Q.RD position);
```

```
                    }
                }
            }
            GetQueue(source core id, target core id)
            {
                ...
                // Calculates the location of queue in memory based on
                    core ids
            }
            PostMessage(Queue Q, Message msg)
            {
                Writeback_L1_cacheline(msg);
                Increment(Q.WR position);
            }
```

The simplified routines illustrate fair load balancing and scheduling. The load balancing that equally utilizes every core in the SoC can be achieved by different graph distribution based on workload specifics.

Figure 9:
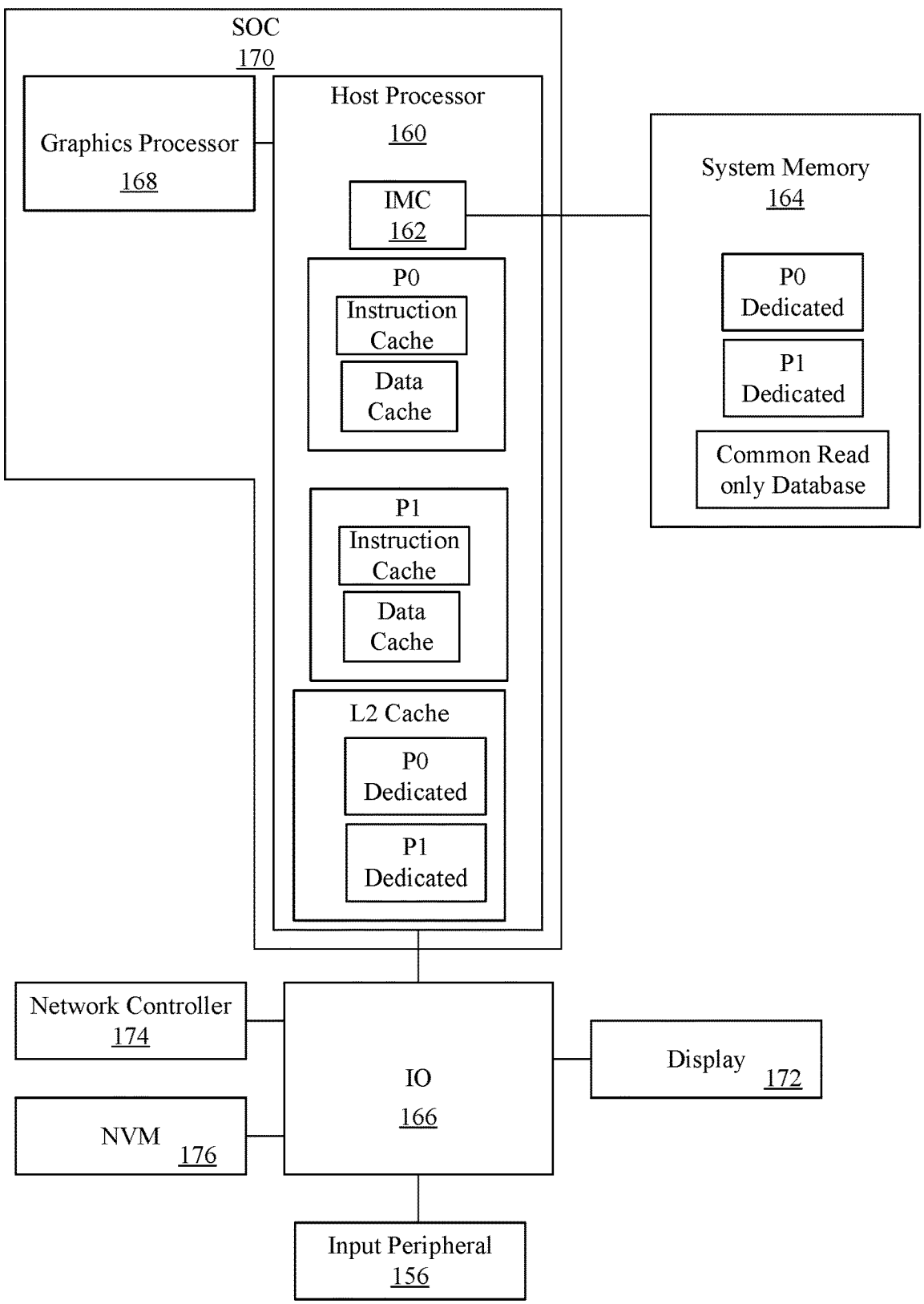
FIG. 9 is a block diagram of an example of a computing system according to an embodiment.

Turning now to FIG. 9, an enhanced, low-latency workload processing computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164.

The illustrated system 158 also includes a graphics processor 168 (e.g., graphics processing unit/GPU) and an input output (IO) module 166 implemented together with the processor 160 (e.g., as microcontrollers) on a semiconductor die 170 as a SOC, where the IO module 166 may communicate with, for example, a display 172 (e.g., touch screen, liquid crystal display/LCD, light emitting diode/LED display), an input peripheral 156 (e.g., mouse, keyboard, microphone), a network controller 174 (e.g., wired and/or wireless), and mass storage 176 (e.g., HDD, optical disc, SSD, flash memory or other NVM).

In some embodiments, the SOC 170 processes a workload. In detail, the SOC 170 may implement instructions stored on, for example, the NVM 176 and/or system memory 164 to process the workload. In some embodiments, the host processor 160 includes two different cores P0, P1. The cores P0, P1 may each be responsible for (e.g., an owner) of data of the workload. Thus, core P0 may be responsible for first data of the workload which may be stored in the data cache of the core P0. P1 may be responsible for second data of the workload that is stored in the data cache of core P1. Each of the cores may process part of the workload with reference to the instruction caches of the cores P0, P1. When either of the cores P0, P1 is to modify first or second data owned by the other of the cores P0, P1, a message may be passed between the cores P0, P1 to modify the first or second data. As illustrated, an L2 cache of the host processor 160 may include P0 dedicated area and P1 dedicated area to ensure that first and second data stored in the L2 cache is not written to by a non-owner of the first and second data. Likewise, system memory 164 (e.g., an L3 cache or FAR memory) may include a P0 dedicated area and a P1 dedicated area, as well as a common read only database.

The common read only database may include constants, parameters and/or other information to execute the workloads by the cores P0, P1. The cores P0, P1 may be heterogeneous (e.g., different generations or types of cores) from each other or homogenous.

In some embodiments, the host processor 160 communicates with other SOCs (not illustrated) to complete the workload. For example, another SOC may be coupled to the SOC 170 through the network controller 174 to execute the workload and allow for communication between SOC 170 and the another SOC. For example, in some embodiments, one of the cores P0, P1 of the host processor 160 sends an instruction through the network controller 174 to a second compute node (e.g., another computing system) to modify information owned by a core of an SOC of the second compute node. The second compute node may include a SOC that is similar to the SOC 170 above, and a description is omitted for brevity. Likewise, the SOC 170 may receive requests from the SOC of the second compute node to modify data owned by the cores P0, P1 of the SOC 170. Thus, an enhanced workload distribution and scheduling scheme is presented to reduced latency and enhance cache reuse rates while reducing cost.

Figure 10:
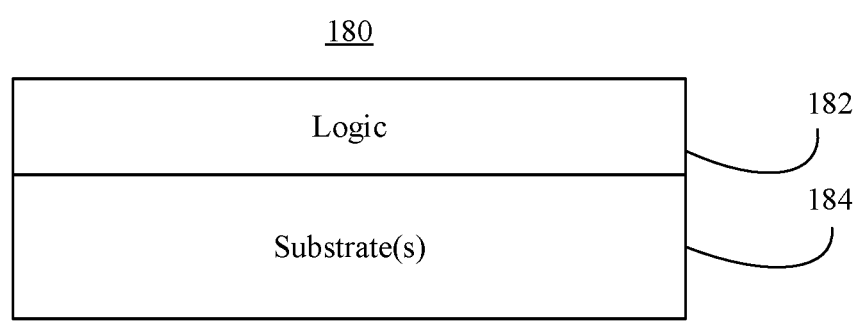
FIG. 10 is an illustration of an example of a semiconductor apparatus according to an embodiment.

FIG. 10 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of the process 100 (FIG. 1), method 370 (FIG. 2), the method 350 (FIG. 3), the method 400 (FIG. 4), the method 450 (FIG. 5), the method 500 (FIG. 7) and/or process 800 (FIG. 8) already discussed. In some embodiments, the logic 182 schedules a workload among a plurality of cores and assigns a plurality of data portions associated with a workload to a plurality of cores, where each data portion is only modifiable by a respective one of the plurality of cores. The cores may be part of the logic 182. The logic 182 may further pass a message between the plurality of cores to modify one or more of the data portions in response to an identification that the one or more of the data portions are unmodifiable by one or more of the plurality of cores. Thus, the logic 182 may control access to the data portions and reduce latency of executing the workload. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 11:
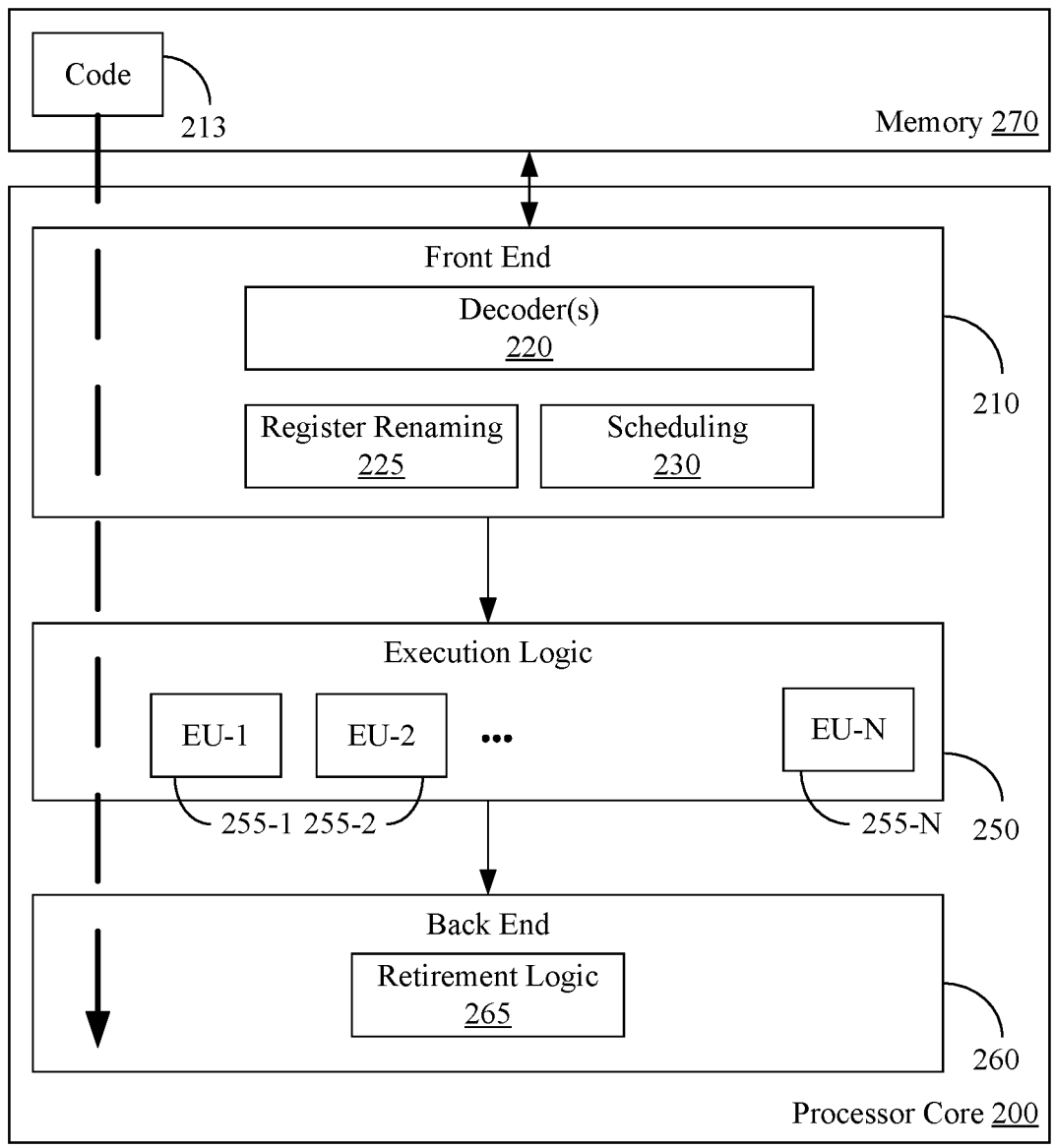
FIG. 11 is a block diagram of an example of a processor according to an embodiment.

FIG. 11 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 11, a processing element may alternatively include more than one of the processor core 200 illustrated in FIG. 11. The processor core 200 may be a single-threaded core or, for at least one embodiment, the processor core 200 may be multithreaded in that it may include more than one hardware thread context (or "logical processor") per core.

FIG. 11 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the process 100 (FIG. 1), method 370 (FIG. 2), the method 350 (FIG. 3), the method 400 (FIG. 4), the method 450 (FIG. 5), the method 500 (FIG. 7), and/or process 800 (FIG. 8) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 11, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 12:
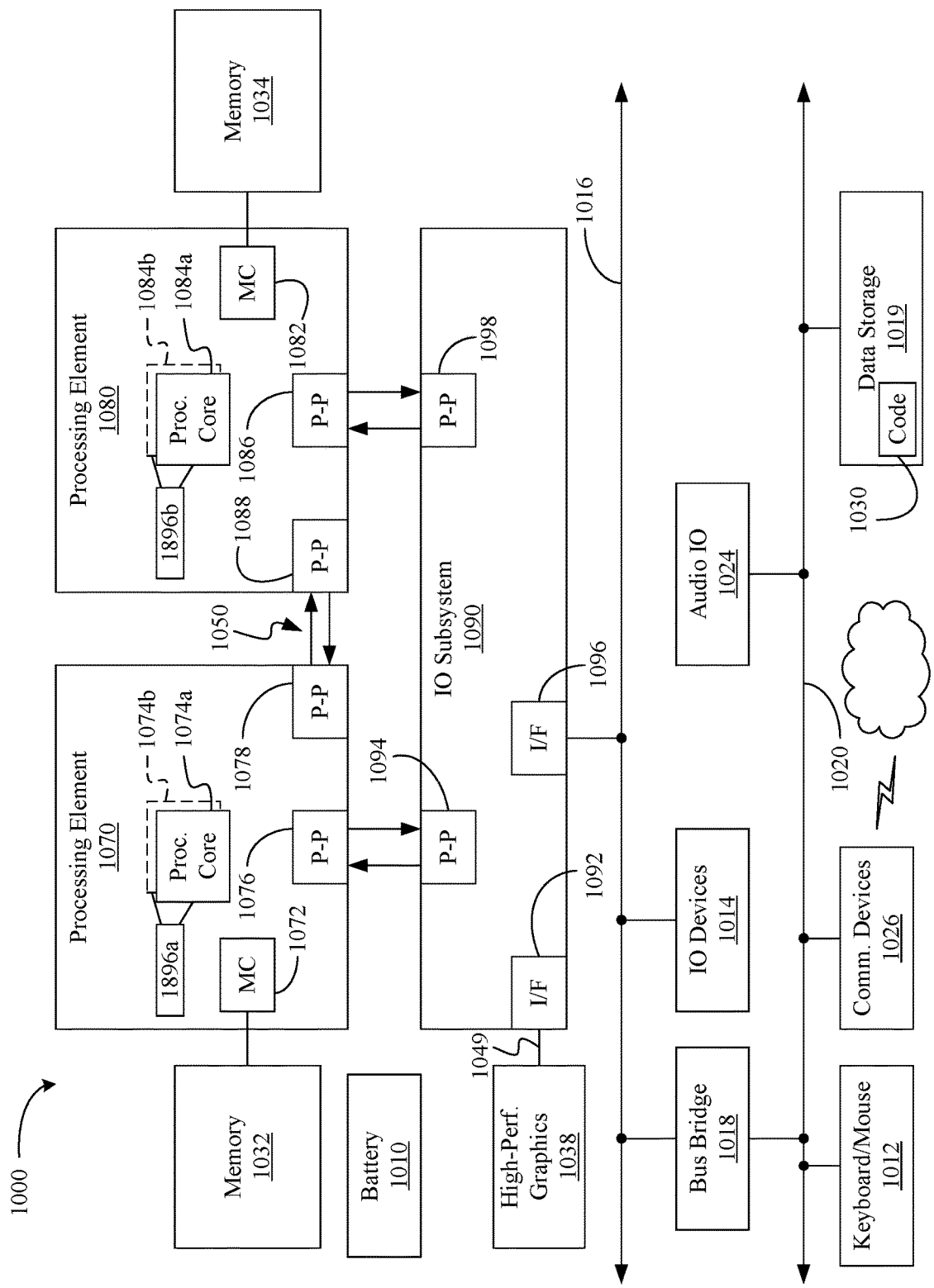
FIG. 12 is a block diagram of an example of a multi-processor based computing system according to an embodiment.

Referring now to FIG. 12, shown is a block diagram of a computing system 1000 embodiment in accordance with an embodiment. Shown in FIG. 12 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 12 may be implemented as a multi-drop bus rather than point-to-point interconnect.

As shown in FIG. 12, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 11.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 12, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 12, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the process 100 (FIG. 1), method 370 (FIG. 2), the method 350 (FIG. 3), the method 400 (FIG. 4), the method 450 (FIG. 5), the method 500 (FIG. 7), and/or process 800 (FIG. 8) already discussed. Further, an audio I/O 1024 may be coupled to second bus 1020 and a battery 1010 may supply power to the computing system 1000.

Note that other embodiments are contemplated. For example, instead of the point-to-point architecture of FIG. 12 a system may implement a multi-drop bus or another such communication topology. Also, the elements of FIG. 12 may alternatively be partitioned using more or fewer integrated chips than shown in FIG. 12.

Additional Notes and Examples

Example 1 includes a computing device comprising a host processor including a plurality of cores, and a memory coupled to the host processor, the memory including executable program instructions, which when executed by the host processor, cause the host processor to assign a plurality of data portions associated with a workload to the plurality of cores, wherein each data portion of the plurality of data portions is only modifiable by a respective one of the plurality of cores, and pass a message between the plurality of cores to modify one or more of the data portions in response to an identification that the one or more of the data portions are unmodifiable by one or more of the plurality of cores.

Example 2 includes the computing device of Example 1, wherein the executable program instructions, which when executed by the host processor, assign each respective core of the plurality of cores, one or more queues that the respective core and another core from the plurality of cores are to access to pass messages.

Example 3 includes the computing device of Example 1, wherein the executable program instructions, which when executed by the host processor, cause the plurality of cores to relay the message through one or more of the plurality of cores to a destination core of the plurality of cores.

Example 4 includes the computing device of Example 1, wherein the executable program instructions, which when executed by the host processor, cause the host processor to assign a first data portion from the plurality of data portions to a first core from the plurality of the cores, determine that a second core from the plurality of cores is to execute an operation of the workload to modify the first data portion, and instruct the first core to execute at least part of the operation to modify the first data portion in response to a determination that the second core is unable to modify the first data portion.

Example 5 includes the computing device of Example 4, wherein the executable program instructions, which when executed by the host processor, cause the host processor to assign a first queue to the first core, wherein the first queue includes at least a portion that only the first and second cores are to access, and read, by the first core, the at least the portion of the first queue to read an instruction from the second core to execute the at least the part of the operation.

Example 6 includes the computing device of Example 5, wherein the instruction includes one or more parameters to execute the at least the part of the operation.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to assign a plurality of data portions associated with a workload to a plurality of cores, wherein each data portion from the plurality of data portions is only modifiable by a respective one of the plurality of cores, and pass a message between the plurality of cores to modify one or more of the data portions in response to an identification that the one or more of the data portions are unmodifiable by one or more of the plurality of cores.

Example 8 includes the apparatus of Example 7, wherein the logic coupled to the one or more substrates is to assign each respective core of the plurality of cores, one or more queues that the respective core and another core from the plurality of cores are to access to pass messages.

Example 9 includes the apparatus of Example 7, wherein the logic coupled to the one or more substrates is to cause the plurality of cores to relay the message through one or more of the plurality of cores to a destination core of the plurality of cores.

Example 10 includes the apparatus of Example 7, wherein the logic coupled to the one or more substrates is to assign a first data portion from the plurality of data portions to a first core from the plurality of the cores, determine that a second core from the plurality of cores is to execute an operation of the workload to modify the first data portion, and instruct the first core to execute at least part of the operation to modify the first data portion in response to a determination that the second core is unable to modify the first data portion.

Example 11 includes the apparatus of Example 10, wherein the logic coupled to the one or more substrates is to assign a first queue to the first core, wherein the first queue includes at least a portion that only the first and second cores are to access, and read, by the first core, the at least the portion of the first queue to read an instruction from the second core to execute the at least the part of the operation.

Example 12 includes the apparatus of Example 11, wherein the instruction includes one or more parameters to execute the at least the part of the operation.

Example 13 includes the apparatus of Example 7, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to assign a plurality of data portions associated with a workload to a plurality of cores, wherein each data portion from the plurality of data portions is only modifiable by a respective one of the plurality of cores, and pass a message between the plurality of cores to modify one or more of the data portions in response to an identification that the one or more of the data portions are unmodifiable by one or more of the plurality of cores.

Example 15 includes the at least one computer readable storage medium of Example 14, wherein the executable program instructions, when executed by the computing system, cause the computing system to assign each respective core of the plurality of cores, one or more queues that the respective core and another core from the plurality of cores are to access to pass messages.

Example 16 includes the at least one computer readable storage medium of Example 14, wherein the executable program instructions, when executed by the computing system, cause the computing system to cause the plurality of cores to relay the message through one or more of the plurality of cores to a destination core of the plurality of cores.

Example 17 includes the at least one computer readable storage medium of Example 14, wherein the executable program instructions, when executed by the computing system, cause the computing system to assign a first data portion from the plurality of data portions to a first core from the plurality of the cores, determine that a second core from the plurality of cores is to execute an operation of the workload to modify the first data portion, and instruct the first core to execute at least part of the operation to modify the first data portion in response to a determination that the second core is unable to modify the first data portion.

Example 18 includes the at least one computer readable storage medium of Example 17, wherein the executable program instructions, when executed by the computing system, cause the computing system to assign a first queue to the first core, wherein the first queue includes at least a portion that only the first and second cores are to access, and read, by the first core, the at least the portion of the first queue to read an instruction from the second core to execute the at least the part of the operation.

Example 19 includes the at least one computer readable storage medium of Example 18, wherein the instruction includes one or more parameters to execute the at least the part of the operation.

Example 20 includes a method comprising assigning a plurality of data portions associated with a workload to a plurality of cores, wherein each data portion from the plurality of data portions is only modifiable by a respective one of the plurality of cores, and passing a message between the plurality of cores to modify one or more of the plurality of data portions in response to an identification that the one or more of the data portions are unmodifiable by one or more of the plurality of cores.

Example 21 includes the method of Example 20, further comprising assigning each respective core of the plurality of cores, one or more queues that the respective core and another core from the plurality of cores are to access to pass messages.

Example 22 includes the method of Example 20, further comprising relaying the message through one or more of the plurality of cores to a destination core of the plurality of cores.

Example 23 includes the method of Example 20, further comprising assigning a first data portion from the plurality of data portions to a first core from the plurality of the cores, determining that a second core from the plurality of cores is to execute an operation of the workload to modify the first data portion, and in response to the determining, instructing the first core to execute at least part of the operation to modify the first data portion.

Example 24 includes the method of Example 23, further comprising assigning a first queue to the first core, wherein the first queue includes at least a portion that only the first and second cores are to access, and reading, by the first core, the at least the portion of the first queue to read an instruction from the second core to execute the at least the part of the operation.

Example 25 includes the method of Example 24, wherein the instruction includes one or more parameters to execute the at least the part of the operation.

Example 26 includes a semiconductor apparatus comprising means for assigning a plurality of data portions associated with a workload to a plurality of cores, wherein each data portion from the plurality of data portions is only modifiable by a respective one of the plurality of cores, and means for passing a message between the plurality of cores to modify one or more of the plurality of data portions in response to an identification that the one or more of the data portions are unmodifiable by one or more of the plurality of cores.

Example 27 includes the semiconductor apparatus of Example 26, further comprising means for assigning each respective core of the plurality of cores, one or more queues that the respective core and another core from the plurality of cores are to access to pass messages.

Example 28 includes the semiconductor apparatus of Example 26, further comprising means for relaying the message through one or more of the plurality of cores to a destination core of the plurality of cores.

Example 29 includes the semiconductor apparatus of Example 26, further comprising means for assigning a first data portion from the plurality of data portions to a first core from the plurality of the cores, means for determining that a second core from the plurality of cores is to execute an operation of the workload to modify the first data portion, and in response to the determining, means for instructing the first core to execute at least part of the operation to modify the first data portion.

Example 30 includes the semiconductor apparatus of Example 29, further comprising means for assigning a first queue to the first core, wherein the first queue includes at least a portion that only the first and second cores are to access, and means for reading, by the first core, the at least the portion of the first queue to read an instruction from the second core to execute the at least the part of the operation.

Example 31 includes the semiconductor apparatus of Example 30, wherein the instruction includes one or more parameters to execute the at least the part of the operation.

Thus, technology described herein may support an implementation in which data coherency and management is implemented in an efficient manner to reduce latency of memory accesses. Furthermore, the technology may not require specialized hardware to enhance the efficiency.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing device comprising:
a host processor including a plurality of cores, wherein the plurality of cores includes a first core and a second core; and a memory coupled to the host processor, the memory including executable program instructions, which when executed by the host processor, cause the host processor to:
assign a plurality of data portions associated with a workload to the plurality of cores, wherein each data portion of the plurality of data portions is only modifiable by a respective one of the plurality of cores, wherein a first data portion from the plurality of data portions is only modifiable by the first core;
identify, with the first and second cores, a queue that is to be only accessible by the first and second cores from the plurality of the cores and is dedicated to communication between the first and second cores;
identify, with the second core, that the second core is to process an operation that is to modify the first data portion;
write, with the second core, an instruction into the queue to instruct the first core to execute at least part of the operation to modify the first data portion in response to a determination that the second core is unable to modify the first data portion;
read, with the first core, the instruction from the queue to cause the first core to execute the at least the part of the operation and modify the first data portion; and
pass a message between the plurality of cores to modify one or more of the data portions in response to an identification that the one or more of the data portions are unmodifiable by one or more of the plurality of cores.

2. The computing device of claim 1, wherein the executable program instructions, which when executed by the host processor, assign each respective core of the plurality of cores, one or more queues that the respective core and another core from the plurality of cores are to access to pass messages.

3. The computing device of claim 1, wherein the executable program instructions, which when executed by the host processor, cause the plurality of cores to relay the message through one or more of the plurality of cores to a destination core of the plurality of cores.

4. The computing device of claim 1, wherein the instruction includes one or more parameters to execute the at least the part of the operation.

5. A semiconductor apparatus comprising: one or more substrates; and a
control logic coupled to the one or more substrates, wherein the control logic is implemented in one or more of configurable logic or fixed-functionality logic hardware, the control logic coupled to the one or more substrates to:
assign a plurality of data portions associated with a workload to a plurality of cores that is to include a first core and a second core, wherein each data portion from the plurality of data portions is only modifiable by a respective one of the plurality of cores, wherein a first data portion from the plurality of data portions is only modifiable by the first core;
identify, with the first and second cores, a queue that is to be only accessible by the first and second cores from the plurality of the cores and is dedicated to communication between the first and second cores;
identify, with the second core, that the second core is to process an operation that is to modify the first data portion;
write, with the second core, an instruction into the queue to instruct the first core to execute at least part of the operation to modify the first data portion in response to a determination that the second core is unable to modify the first data portion;
read, with the first core, the instruction from the queue to cause the first core to execute the at least the part of the operation and modify the first data portion; and
pass a message between the plurality of cores to modify one or more of the data portions in response to an identification that the one or more of the data portions are unmodifiable by one or more of the plurality of cores.

6. The apparatus of claim 5, wherein the control logic coupled to the one or more substrates is to assign each respective core of the plurality of cores, one or more queues that the respective core and another core from the plurality of cores are to access to pass messages.

7. The apparatus of claim 5, wherein the control logic coupled to the one or more substrates is to cause the plurality of cores to relay the message through one or more of the plurality of cores to a destination core of the plurality of cores.

8. The apparatus of claim 5, wherein the instruction includes one or more parameters to execute the at least the part of the operation.

9. The apparatus of claim 5, wherein the control logic coupled to the one or more substrates includes transistor channel regions that are positioned within the one or more substrates.

10. At least one computer readable storage medium comprising a set of executable program instructions, which when executed by a computing system, cause the computing system to:
- assign a plurality of data portions associated with a workload to a plurality of cores that is to include a first core and a second core, wherein each data portion from the plurality of data portions is only modifiable by a respective one of the plurality of cores, wherein a first data portion from the plurality of data portions is only modifiable by the first core;
- identify, with the first and second cores, a queue that is to be only accessible by the first and second cores from the plurality of the cores and is dedicated to communication between the first and second cores;
- identify, with the second core, that the second core is to process an operation that is to modify the first data portion;
- write, with the second core, an instruction into the queue to instruct the first core to execute at least part of the operation to modify the first data portion in response to a determination that the second core is unable to modify the first data portion;
- read, with the first core, the instruction from the queue to cause the first core to execute the at least the part of the operation and modify the first data portion; and
- pass a message between the plurality of cores to modify one or more of the data portions in response to an identification that the one or more of the data portions are unmodifiable by one or more of the plurality of cores.

11. The at least one computer readable storage medium of claim 10, wherein the executable program instructions, when executed by the computing system, cause the computing system to assign each respective core of the plurality of cores, one or more queues that the respective core and another core from the plurality of cores are to access to pass messages.

12. The at least one computer readable storage medium of claim 10, wherein the executable program instructions, when executed by the computing system, cause the computing system to cause the plurality of cores to relay the message through one or more of the plurality of cores to a destination core of the plurality of cores.

13. The at least one computer readable storage medium of claim 10, wherein the instruction includes one or more parameters to execute the at least the part of the operation.

14. A method implemented with at least one processor having thereon memory-stored instructions which, when executed by the at least one processor, cause the at least one processor to perform the method, comprising:
- assigning a plurality of data portions associated with a workload to a plurality of cores that includes a first core and a second core, wherein each data portion from the plurality of data portions is only modifiable by a respective one of the plurality of cores, wherein a first data portion from the plurality of data portions is only modifiable by the first core;
- identifying, with the first and second cores, a queue that is to be only accessible by the first and second cores from the plurality of the cores and is dedicated to communication between the first and second cores;
- identifying, with the second core, that the second core is to process an operation that is to modify the first data portion;
- writing, with the second core, an instruction into the queue to instruct the first core to execute at least part of the operation to modify the first data portion in response to a determination that the second core is unable to modify the first data portion;
- reading, with the first core, the instruction from the queue to cause the first core to execute the at least the part of the operation and modify the first data portion; and
- passing a message between the plurality of cores to modify one or more of the plurality of data portions in response to an identification that the one or more of the data portions are unmodifiable by one or more of the plurality of cores.

15. The method of claim 14, further comprising assigning each respective core of the plurality of cores, one or more queues that the respective core and another core from the plurality of cores are to access to pass messages.

16. The method of claim 14, further comprising:
relaying the message through one or more of the plurality of cores to a destination core of the plurality of cores.

17. The method of claim 14, wherein the instruction includes one or more parameters to execute the at least the part of the operation.

* * * * *